United States Patent [19]

Herd

[11] 4,340,204

[45] Jul. 20, 1982

[54] HIGH PRESSURE GATE VALVE WITH PRELOADED, STACKED, SOLID LUBRICATED STEM SEALS

[75] Inventor: David P. Herd, Houston, Tex.

[73] Assignee: Smith International, Inc., Newport Beach, Calif.

[21] Appl. No.: 833,684

[22] Filed: Sep. 15, 1977

Related U.S. Application Data

[63] Continuation-in-part of Ser. No. 655,693, Feb. 6, 1976, abandoned.

[51] Int. Cl.³ .................. F16K 41/04; B65D 53/02
[52] U.S. Cl. ..................... 251/327; 277/59; 277/112; 277/188 R; 251/214; 251/355
[58] Field of Search ............... 251/214, 327, 355, 368; 277/188 A, 188 R, 206.1, DIG. 6, 59, 112

[56] References Cited

U.S. PATENT DOCUMENTS

| | | | |
|---|---|---|---|
| 2,822,824 | 2/1958 | Glower et al. | 251/368 X |
| 2,842,336 | 7/1958 | Johnson | 251/330 |
| 2,973,978 | 3/1961 | Oppenheim | 277/188 A |
| 3,009,721 | 11/1961 | Newton | 277/188 R |
| 3,057,596 | 10/1962 | Tobin | 251/214 |
| 3,094,337 | 6/1963 | Pippert et al. | 277/188 R |
| 3,094,337 | 6/1963 | Pippert et al. | |
| 3,096,070 | 7/1963 | Wolfensperger | 251/214 |
| 3,098,660 | 7/1963 | Hausner | 277/206.1 |
| 3,103,366 | 9/1963 | Dunn | 277/170 |
| 3,331,609 | 7/1967 | Moran | 277/84 |
| 3,469,853 | 9/1969 | Gullick | 277/188 R |
| 3,492,009 | 1/1970 | Beresnev et al. | 277/188 R |
| 3,540,533 | 11/1970 | Morrill | 166/315 |
| 3,606,359 | 9/1971 | McCormick | 277/224 |
| 3,690,682 | 9/1972 | Ferrill | 277/102 |
| 3,719,366 | 3/1973 | Pippert | |
| 3,758,072 | 9/1973 | Herd | 251/332 |
| 3,851,853 | 12/1974 | Teeters | 251/214 |
| 3,888,496 | 6/1975 | Dryer | 277/188 X |
| 3,901,517 | 8/1975 | Heathcott | |
| 3,954,932 | 5/1976 | Coale | 277/DIG. 6 |
| 3,990,679 | 11/1976 | Boitnott | 251/214 |
| 4,029,294 | 6/1977 | McCaskill et al. | 251/282 |
| 4,109,942 | 8/1978 | Morrill | 285/140 |

FOREIGN PATENT DOCUMENTS

| | | |
|---|---|---|
| 729482 | 3/1966 | Canada . |
| 17518 | of 1894 | United Kingdom ............... 277/119 |
| 763187 | 12/1956 | United Kingdom . |
| 779763 | of 1957 | United Kingdom . |
| 944604 | 12/1963 | United Kingdom . |
| 1256585 | of 1971 | United Kingdom . |
| 1344597 | 1/1974 | United Kingdom . |

Primary Examiner—Arnold Rosenthal
Attorney, Agent, or Firm—David Alan Rose; Ned L. Conley; William E. Shull

[57] ABSTRACT

A high pressure gate valve having at least one pressure actuated seal means between the bonnet part of the valve body and the valve actuating stem and between the chamber part of the valve body and the valve actuating stem is disclosed. Each seal means includes at least one seal assembly. Each seal assembly includes two sets of plural, e.g., four, metal rings with an elevated temperature resistant and chemical resistant ring of solid lubricant, e.g., tetrafluoroethylene or graphite, separating the metal rings. Each metal ring is softer than the stem and is of rectangular cross-section. The seal assembly is actuated by pressure on larger follower metal rings. When multiple seal means are involved, another metal follower ring larger than the set of metal rings of the seal means also separates the two sets of seal assemblies. The seal means may also include a biasing spring. Each seal means is disposed in an annular pocket or stuffing box in the adjacent part of the valve body extending around the stem. Each stuffing box is closed by an annular packing gland screwed into the stuffing box far enough to flatten out the lubricant sufficiently for the inner and outer peripheries of the inner and outer metal rings respectively of the set of metal rings to engage the stem and stuffing box walls respectively and seal in the lubricant ring. The valve stem sealing arrangement may also be employed for packing off lock screws and in other situations wherein relatively movable parts are to be sealed both during and after relative motion.

12 Claims, 12 Drawing Figures

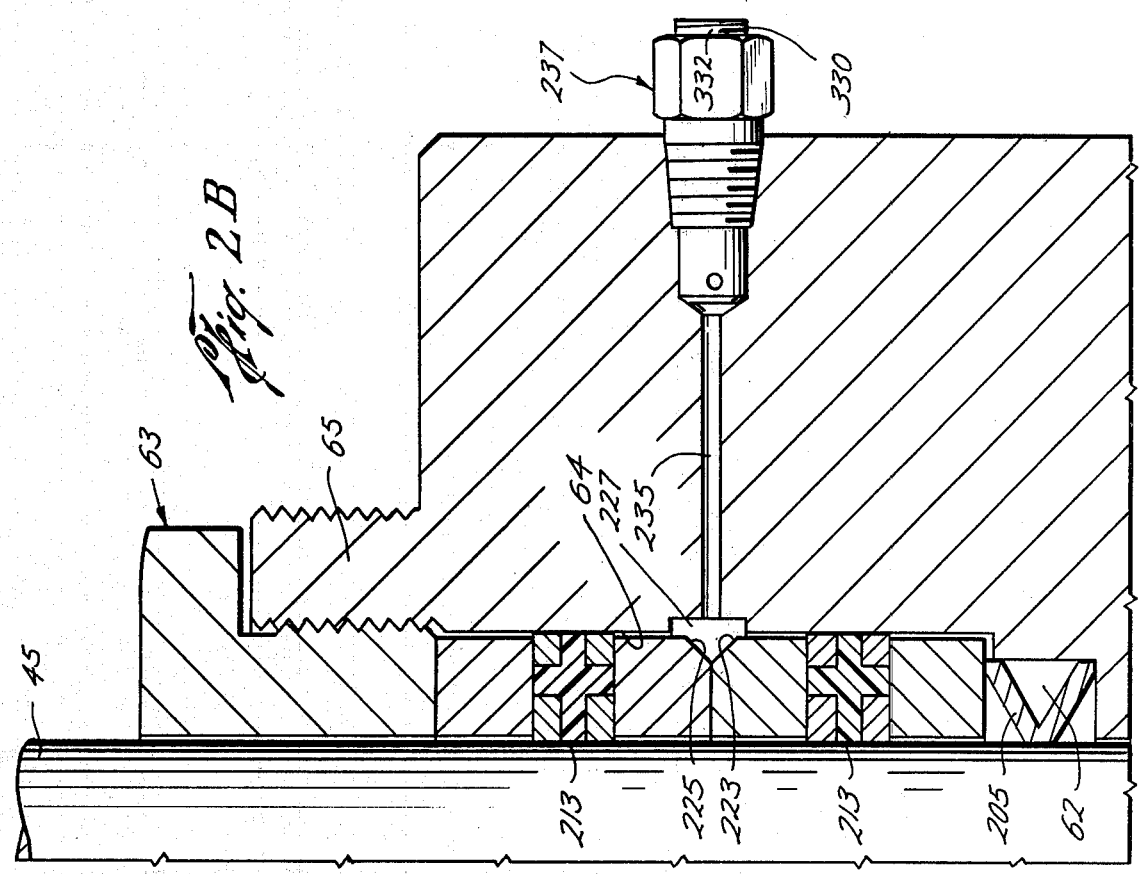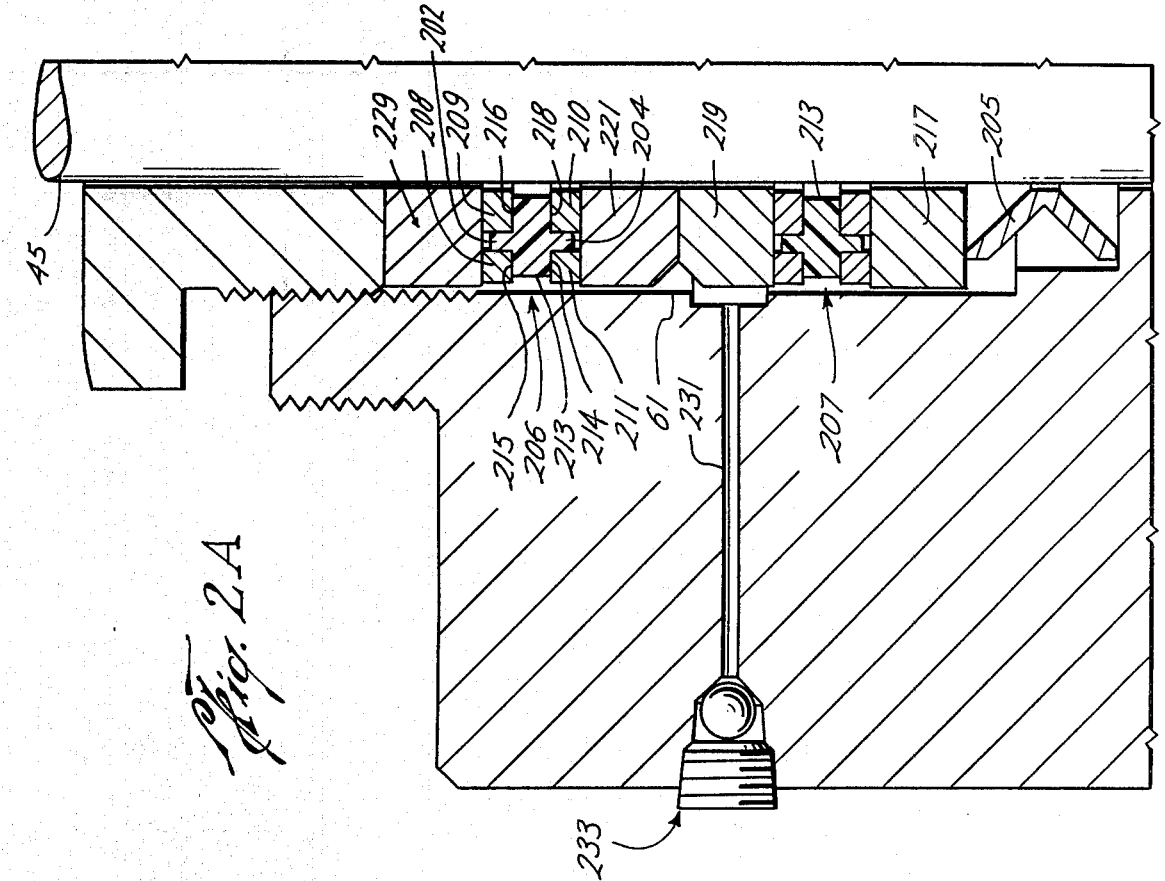

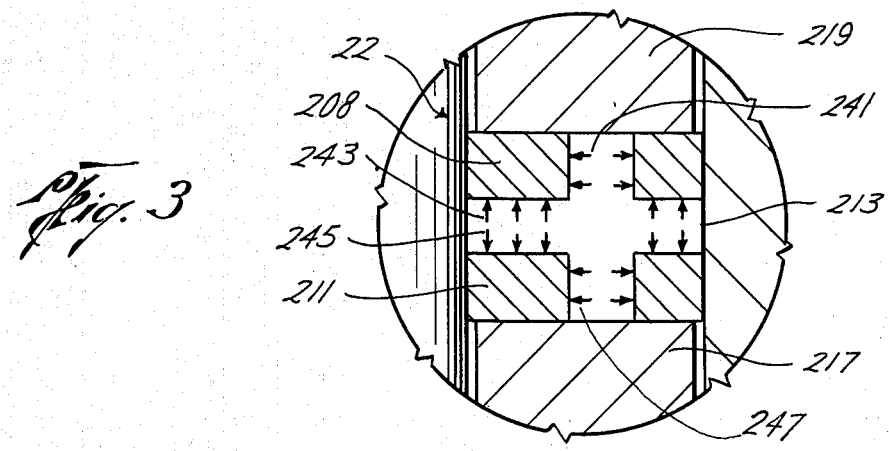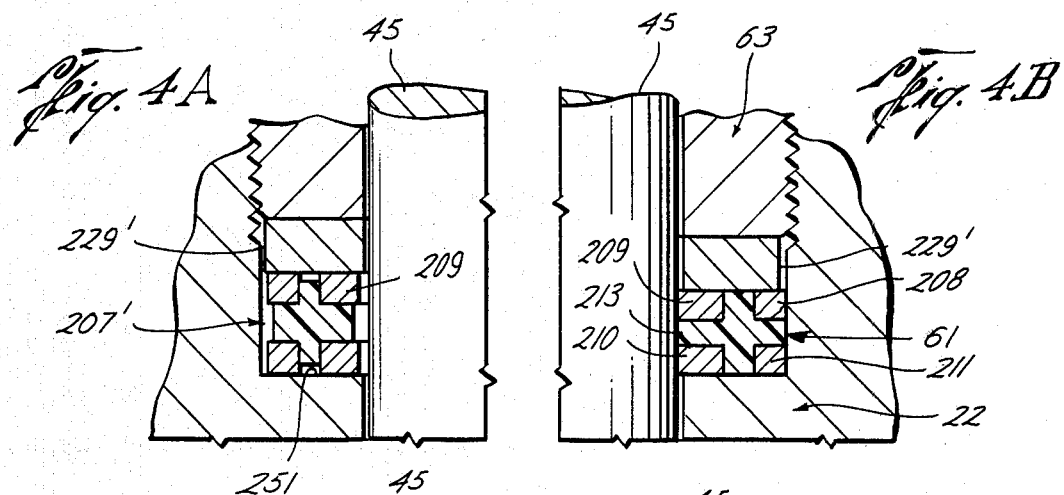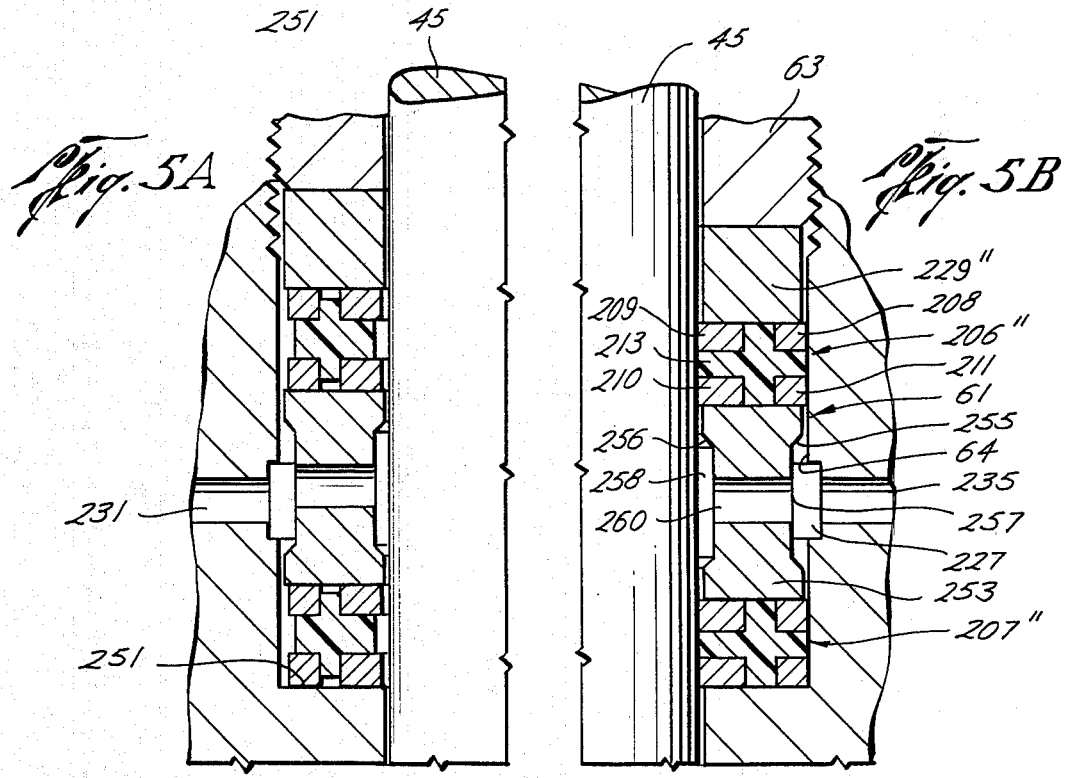

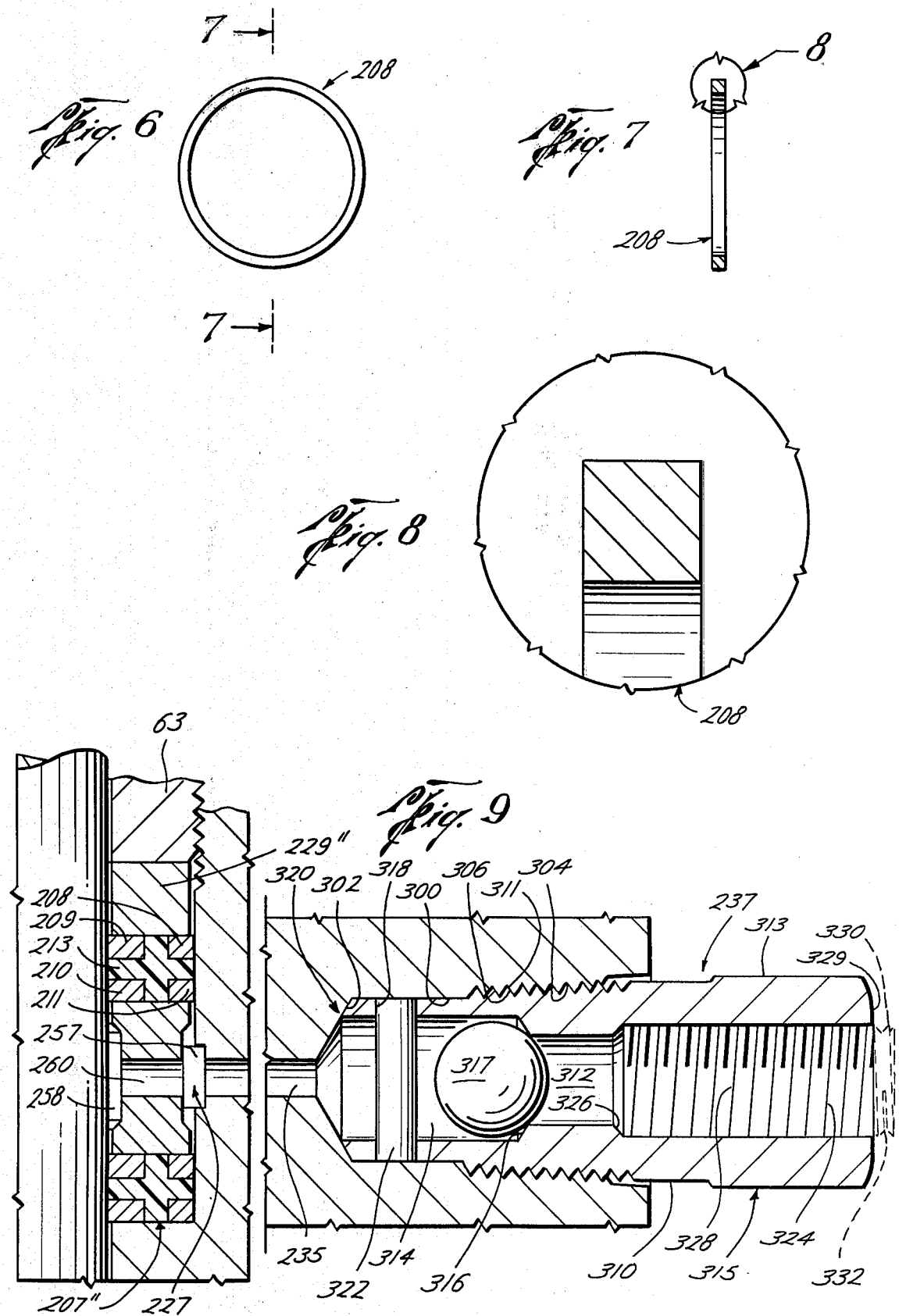

HIGH PRESSURE GATE VALVE WITH PRELOADED, STACKED, SOLID LUBRICATED STEM SEALS

This is a continuation-in-part of Application Ser. No. 655,693, filed Feb. 6, 1976, and now abandoned.

CROSS REFERENCES TO RELATED APPLICATIONS

The valve of this invention is of the high pressure gate valve type as disclosed in pending U.S. patent application Ser. No. 655,693 filed Feb. 6, 1976, by Herd entitled "High Pressure Valve" which is a divisional application of U.S. patent application Ser. No. 512,368 filed Oct. 4, 1974, now abandoned.

The valve construction of the present invention is the same as that disclosed in the above referenced application except for the stem sealing means.

The foregoing applications are assigned to the owner of the present application and their disclosures are incorporated herein by reference, including the references to the state of the art.

Applicant claims the priority of his aforementioned pending U.S. application Ser. No. 655,693 filed Feb. 6, 1976, and his prior U.S. application Ser. No. 512,368 filed Oct. 4, 1974, of which Ser. No. 655,693 is a division.

BACKGROUND OF THE INVENTION

1. Field of the Invention

This invention relates to valves and more particularly to temperature and chemical resistant, high pressure gate valves.

2. Description of the Prior Art

A non-rising stem gate valve with separable seats and automatic plastic sealed gate-seat and seat-body interfaces is disclosed in U.S. Pat. No. 2,433,638—Volpin. A similarly sealed valve of the rising stem, balanced type intended for high pressure use is disclosed in U.S. Pat. No. 3,538,938—Volpin and 3,696,831—Fowler et al. In the latter two patents, stem packing compressed by packing glands is employed for the stem seals.

In recent years, a few wells have been drilled in very high pressure sour gas fields. These wells have bottom hole pressures to 22,000 psi (152 MPa) and bottom hole temperatures up to 385° Fahrenheit (196° Centigrade). The well fluids contain methane, some $CO_2$, salt water, and high percentage of $H_2S$, such as 27 to 46 percent $H_2S$ for example. Lower pressure fields with high percentages of $H_2S$ are also being produced. Several references have indicated that the standard oilfield valve elastomer stem packings which have worked well with fluids containing small amounts of $H_2S$ and at temperatures less than 250° Fahrenheit (121° Centigrade) will deteriorate and leak after only a short period in an elevated temperature and $H_2S$ environment. See, for example, Hamby, T. W. and Tuttle, R. N., "Deep High-Pressure Sour Gas Wells—An Industry Challenge," 1975 Annual Meeting, Division of Production, American Petroleum Institute and Hamby, T. W., Broussard, L. P., and Taylor, D. B., "Producing Mississippi's Deep High Pressure Sour Gas," Paper No. SPE 5604, Society of Petroleum Engineers of American Institute of Mining, Metallurgical, and Petroleum Engineers, Inc., 1975.

The types of valve stem packing used to date in oilfield valves have included molded packing rings, such as the chevron packing, compression packing with an adjustable packing gland, and plastic injected type packing between elastomer seals. To control the effects of the sour gas on these seals, elastomer materials, such as fluoroplastics and asbestos compounds, have been tried with some success. However, the combined effects of the higher pressure and elevated temperature have caused failures of seals made from these new materials as well.

The primary design requirement for a high pressure valve stem packing is to seal, bubble-tight, gas with a high percentage of $H_2S$ at 25,000 psi (172 MPa) working pressure at 300° Fahrenheit (149° Centigrade) with hydrostatic test pressure at, for example, 37,500 psi (259 MPa). Additional design requirements are low friction, low maintenance, and a long service life. The preferred design for the valve stuffing box would allow application of the seal to balanced or unbalanced stem, rising or non-rising stem valves and would be as short as possible. The stem packing cycle life is important and should be relatively high, such as, for example, 300 cycles without leakage. A cycle is defined as the stem movement to first open a gate valve and then close the valve. The 300-cycle number is, for example, based on operation of a valve once per week for approximately six years. Designs which did not rely on extended neck bonnets or air cooling fins to lower the packing temperature are also desirable.

A valve known as a "Graygate" appears to employ a plurality of seals, which may have anti-extrusion washers disposed on the top and bottom surfaces of each seal, around the valve stem and in a bonnet pocket, but the valve is not actuated by pressures arising from pressuring the plastic sandwich seal. See, for example, U.S. Pat. No. 3,990,679 to Boitnott.

It is believed that the valve of the present invention can be used without leakage in environments of high $H_2S$ content with higher pressure and over a wider temperature range than the valves discussed above.

SUMMARY OF THE INVENTION

According to the invention, a high pressure gate valve has at least one pressure actuated seal means in the stuffing box between the bonnet part of the valve body and the valve actuating stem and, for balanced valves, between the chamber part of the valve body and the balancing stem. The seal means includes a packing gland for actuating the seal and at least one seal assembly. Each seal assembly has at least one set of plural metal rings with an elevated temperature resistant and chemical resistant ring of solid lubricant between the set of plural metal rings. Each metal ring is softer than the stem and is of, for example, rectangular cross-section. Each seal assembly is actuated by a metal follower ring larger than any of the set of plural metal rings. The metal follower ring transmits pressure from the packing gland to the seal means. When multiple sets of seal means, e.g., two sets of plural metal ring/lubricant combinations, are used, the sets are usually separated by another metal ring of, for example, substantially rectangular cross-section which is larger than any of the set of plural metal rings. The seal means may also include a biasing spring. The packing gland is screwed into the stuffing box far enough to elastically or plastically deform the lubricant sufficiently to exert sufficient pressure on the set of plural metal rings to cause the inner and outer peripheries of the inner and outer metal rings respectively to engage the stem and stuffing box respectively. The valve stem sealing arrangement may also be employed for packing off lock screws and in other situations wherein relatively movable parts are to be sealed both during and after relative motion.

BRIEF DESCRIPTION OF THE DRAWINGS

For a further understanding of the nature and objects of the present invention, reference will be made to the following detailed description, taking in conjunction with the accompanying drawings in which like parts are given like reference numerals and wherein:

FIG. 2 is a fragmentary sectional schematic view taken in the same plane as FIG. 1 but to a larger scale and showing the actuator and stem seal means, the half of the drawing at the left (FIG. 2a) depicting the seal means in the unloaded condition, and the half of the drawing at the right (FIG. 2b) showing the seal means as it appears when loaded by the packing gland and line fluid;

FIG. 3 is a fragmentary sectional schematic view taken in the same plane as FIG. 1 but to a larger scale and depicting the mode of operation of the stem seal assembly of the invention in preloaded condition;

FIG. 4 is a fragmentary sectional schematic view of a second preferred embodiment taken in the same plane as FIG. 1 but to a larger scale and showing the actuator and stem seal means, the half of the drawing at the left (FIG. 4a) depicting the seal means in the unloaded condition and the half of the drawing at the right (FIG. 4b) showing the seal means as it appears when loaded by the packing gland;

FIG. 5 is a fragmentary sectional schematic view of a third preferred embodiment taken in the same plane as FIG. 1 but to a larger scale and showing the actuator and stem seal means, the half of the drawing at the left (FIG. 5a) depicting the seal means in the unloaded condition and the half of the drawing at the right (FIG. 5b) showing the seal means as it appears when loaded by the packing gland;

FIG. 6 is a side view of a metal ring of the preferred embodiment of the apparatus of the invention;

FIG. 7 is a cross sectional view of the metal ring of FIG. 6 taken along section lines 7—7;

FIG. 8 is a fragmentary view of the section of FIG. 7 showing the cross section of the metal ring; and FIG. 9 is an expanded view of the fragmentary sectional view of FIG. 5 showing the plastic packing fitting in section.

DESCRIPTION OF PREFERRED EMBODIMENT

Figure 1:
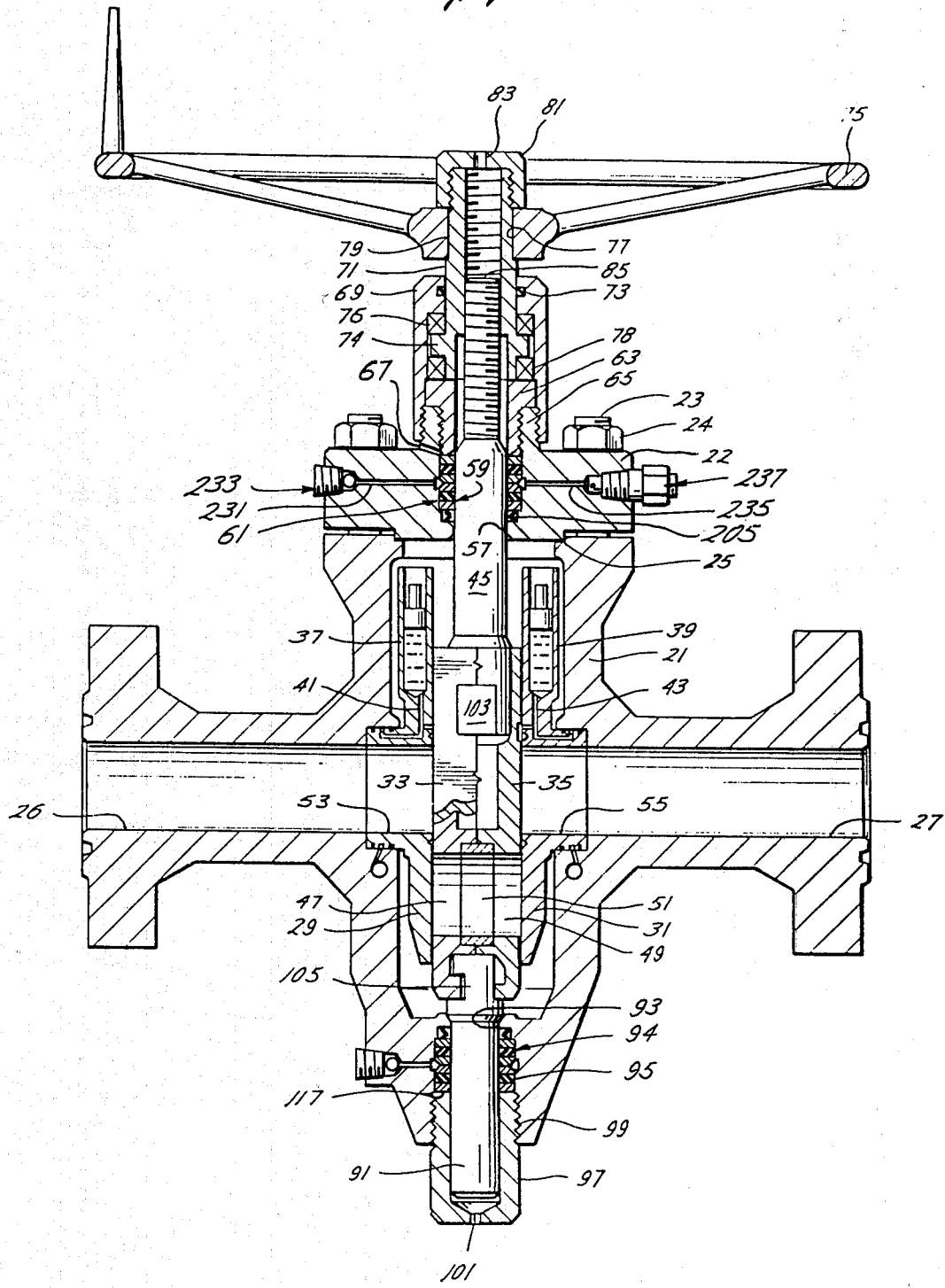
FIG. 1 is a vertical section through a valve embodying the first preferred embodiment of the apparatus of the invention.

The seal of the present invention is shown in FIGS. 1-3. The valve includes a hollow body having a chamber part 21 and a bonnet part 22, Bonnett part 22 is secured to chamber part 21 by studs 23 and nuts 24. The chamber part 21 and bonnet part 22 are sealed by suitable sealing means 25. Passages 26, 27 in the chamber part 21 provide a path for fluid flow into and out of the chamber part 21. Seats 29, 31 mounted at the inner ends of passages 26, 27 cooperate with a pair of ported gates 33, 35 which control flow of fluid (e.g. water, oil, gas) through the valve. Plastic sealant material is stored in reservoirs 37, 39, and sealant is automatically supplied through the sealant distribution passages 41, 43 to the gate-seat and seat neck-body interfaces to effect sealing, as described in the above mentioned patents and applications. The valve is rated at 25,000 psi working pressure and may be tested at up to 37,500 psi.

The gates are reciprocated by a generally cylindrical actuating stem 45 between the closed position shown in FIG. 1 and an open position in which the gate ports 47, 49 and the bridge ring 51 thereacross are in register with the ports 53, 55 in the valve seats. The upper end of the actuating stem 45 extends out of the valve chamber 21 through port 57 in the bonnet 22. Stem seal means 59 in accordance with the invention seals between the stem 45 and a cylindrical pocket or stuffing box 61 in the bonnet 22. Stem seal means 59 is compressed in stuffing box 61 by means of compression plug or packing gland 63 which is screwed into internally threaded neck 65 on the top of the bonnet 22. Stuffing box 61 includes a short, narrow bore 62 and a long, wider, coaxial bore 64 (FIG. 2). Bleed port 67 allows fluid or plastic packing to escape from between the stuffing box 61 and the packing gland 63.

The exterior of bonnet neck 65 is also threaded and receives a bearing cap 69 screwed thereto. Actuator nut 71, screwed onto the threaded upper end of actuator stem 45, has a flange 74 disposed between axial thrust bearing 76, 78. The bearings 76, 78 also engage the top of packing gland 63 and the upper end of cap 69. Cap 69 is sealed to the nut 71 by 0 ring seal 73. Hand wheel 75 has a noncircular aperture 77 fitted over a correlatively shaped portion 79 of the nut 71. The wheel is held in place by retainer nut 81 screwed to the upper end of actuator nut 71. A bleed port 83 allows fluid or entrapped lubricant to escape from between the actuator nut 71 and the upper end 85 of the actuator stem 45.

To the lower ends of the gates 33, 35 is connected a generally cylindrical balance stem 91 which extends out of the valve chamber through port 93. Stem seal means 94 in accordance with the invention seals between the balance stem 91 and a cylindrical pocket or stuffing box 95 in the valve body. Stem seal means 94 is compressed in stuffing box 95 by means of a compression plug or packing gland 97 which is screwed into threaded socket 99 coaxial with port 93 and stuffing box 95. Stuffing box 95 is of substantially the same shape as stuffing box 61. A bleed port 101 at the bottom of packing gland 97 allows fluid or entrapped lubricant to escape from between the end of the packing gland 97 and the end of the balance stem 91.

When hand wheel 75 is turned, actuator nut 71 turns and causes actuator stem 45 to raise or lower the gates 33, 35 to which it is connected by Tee head 103. This in turn causes balance stem 91, connected to the gates 33, 35 by loose fitting head 105, to move up or down. There is thus relative axial motion between each of the stems 45, 91 and the respective one of the stem seal means 59, 94. The stem seal means 59, 94 must remain tight during such relative motion. Although stem seal means 59, 94 may be used for static seals, stem seal means 59, 94 also fall in the class of sliding seal means as distinct from the static seal means 25 between the bonnet 22 and chamber parts of the valve body where no relative motion occurs.

The stem material may, for example, be K-Monel, but a comparable steel would be suitable. Stems 45, 91 may be further coated with a hard overlay, such as, for example, tungsten carbide of 0.003 to 0.005 inch thickness to raise the hardness of stem 45, such as, for example, to 70 Rockwell hardness. This will prevent galling and corrosion of stems 45, 91 as discussed infra.

The body (chamber part 21 and bonnet part 22), may be made of any steel conventionally used for high pressure valves.

The stuffing boxes and stems need employ only ordinary smooth machine finishes comparable with those ordinarily used for elastomer packings.

The tolerance for the diameter of the stems may be, for example, minus 0.002, for stems with a diameter of 1.375 inch. The tolerance for the diameter of the stuffing boxes may be, for example plus 0.005 inch for a stuffing box with a diameter of 2.000 inch.

Stem seal means 59, 94 are alike, so only one need be described in further detail. Stem seal means 59 includes a cylindrical spring 205 located in the bottom narrow bore 62 of stuffing box 61. Stem seal means 59 also includes a metal ring 217 of a rectangular, such as square, cross section located adjacent spring 205. Stem seal means 59 further includes a stack of two seal assemblies 206, 207 separated by metal ring assembly 219, 221. Each seal assembly 206, 207 includes a set of metal rings 208-211. Metal rings 208-211 have a rectangular, including square, cross section. For example, metal rings 208, 211 may be substantially square in cross section and metal rings 210, 209 may be more generally rectangular in cross section. Each set of metal rings is separated by an elastic solid lubricant or sandwich or sealing ring 213 of lower elastic modulus than the metal rings 208-211, the latter preferably being made of steel. Lubricant or sandwich rings 213 have the cross sectional shape of a cross with a set of four substantially rectangular cut-outs 214, 215, 216, 218 on their peripheries (FIG. 2a).

Upon compression, the metal rings 208-211 form metal-to-metal back-up seals with the stem 45 and stuffing box 61. These seals prevent the flow or extrusion of the sandwich material from between the metal rings 208-211 and the stem 45 or the stuffing box 61. The sandwich rings 213 form the gas and fluid tight seals with stem 45 and stuffing box 61. It may be noted at this point that it is only the seals between stem 45, metal rings 209, 210, and sandwich rings 213 that are sliding seals. The seals between metal rings 208, 211, stuffing box 61 and sandwich rings 213 are static seals.

The size of these cut-outs 215-218 should be sufficient to permit separation of metal rings 208-211 from one another by a flange of the lubricant ring 213 when packing gland 63 actuates seal assemblies 206, 207 to bring metal ring gaskets 208-211 substantially in contact with the walls of stuffing box 61 and stem 45 (FIG. 2b).

The metal ring assembly 219, 221 includes adjacently stacked metal rings 219, 221. Metal rings 219, 221 are located such that metal ring 219 is adjacent to lower seal assembly 207 with ring 221 adjacent to ring 219. Metal rings 219, 221 have substantially the same cross section shape and area as metal ring 217. Metal ring 219 also includes upwardly, outwardly facing slanted shoulder 223, located on the upper outer periphery of ring 219. Metal ring 221 includes downwardly, inwardly facing slanted shoulder 225 located on the lower outer periphery of ring 221. Shoulders 223, 225 are juxtaposed forming annular space 227 between them.

Seal assembly 206 is stacked adjacent to the upper end of metal ring 221.

Stem seal means 59 further includes upper or follower metal ring 229 stacked adjacent to seal assembly 206. Metal ring 229 has substantially the same cross section shape and area as metal ring 217.

In order to prevent leakage despite cycles of high and low pressure, the packing gland 63 is tightened to preload the stem seal means 59 to a stress higher than the highest expected fluid pressure will cause. Typical makeup is with a torque of 600 to 900 pound-feet on the packing gland 63.

The width and length of the cross section of metal rings 208-211 are approximately one-third of the width and length of metal rings 217, 219, 221 and 229.

Metal rings 208, 211 should be machined for very close fit on the inner diameter of stuffing box 61. For example, the tolerance for the outer diameter of metal rings 208, 211 might be minus 0.002 inch for an outer diameter of the metals rings 208, 211 of 1.999 inch. The clearance, for this illustration, between the outer diameter of the metal rings 208, 211 and the inner diameter of stuffing box 61, for example, would be in the order of magnitude of 0.0005 to 0.004 inch. Metal rings 209, 210 should be machined for very close fit on the outer diameter of stem 45. The clearance, for the illustration supra, between the inner diameter of metal rings 209, 210 and the outer diameter of stem 45, for example, would be in the order of magnitude of 0.002 to 0.006 inch. As discussed in detail infra, metal ring gaskets 208-211 should have a thin cross section. For the above example, metal rings 208, 211 may be 0.100 inch to 0.103 inch high and wide and metal rings 209, 210 may be 0.100 inch to 0.103 inch high and 0.150 inch to 0.153 inch wide.

The metal rings 208-211 should not be of hard material, such as that used with Belleville springs which would be too hard and would gall the stems 45, 91. Rather, metal rings 208-211 should be made of softer metal than stems 45, 91, e.g., 316 stainless steel for low yield and corrosion resistance. The metal rings 208-211 must be able to form a metal back-up seal with the stem 45 (which may be only 30 to 35 Rockwell hardness) without imprint or the galling of stem 45.

Metal rings 217, 219, 221 and 229 should also be machined for a close fit on the inner diameter of stuffing box 61 and the outer diameter of stem 45. The clearances between the inner diameter of rings 217, 219, 221 and 229 and the outer diameter of stem 45 and the clearances between the outer diameter of rings 217, 219, 221 and 229 and the inner diameter of stuffing box 61 are not as critical and can be somewhat larger than for metal rings 208-211. The looser tolerances with respect to the stuffing box 61 and stem 45 should insure substantial non-contact of metal rings 217, 219, 221, 229 with the stem 45 upon compression by the packing gland 63 and turning of stem 45.

The metal rings 217, 219, 221, 229 may be of fairly hard material such as 1040 or 4140 steel.

In conformance with the examples supra of the dimensions for stem 45, stuffing box 61, and metal rings 208-211, the tolerance for the outer diameter of sandwich ring 213 might be, prior to compression, minus 0.005 inch for an outer diameter of sandwich ring 213 of 1.985 inch. The clearance between the outer diameter of sandwich ring 213 and the inner diameter of stuffing box 61, for this example, would be, prior to compression, in the order of magnitude of 0.0075 to 0.0125 inch. The uncompressed inner diameter tolerances of sandwich ring 213 for this example would be similar to the outer diameter tolerances, and the clearance between the inner diameter of sandwich ring 213 and the outer diameter of stem 45 would be, for this example, similar to the clearance between the outer diameter of sandwich ring 213 and the inner diameter of stuffing box 61. The uncompressed tolerance for the height of upper flange 202 and lower flange 204 of ring 213 above the base line of the rectangular cutouts of ring 213, for this example, would be plus 0.003 inch for a height of 0.094 inch. The clearance between the height of the upper edge of flange 202, or the lower edge of flange 204, and the height of metal rings 208–211, for this example, would be, prior to compression, in the order of magnitude of 0.003 to 0.009 inch.

Preferably, the sandwich rings are initially of a cross configuration. Because the sandwich rings 213 will be subjected to the temperature and chemical activity of the fluid being controlled by the valve as well as to the ambient temperature and medium in which the valve is to operate, the sandwich material should be resistant to expected chemical action and expected temperature ranges, e.g. 300 degrees Fahrenheit down to ten degrees below zero Fahrenheit or even lower. Materials suitable for a range extending down to 75 degrees below zero Fahrenheit would be desirable. Materials suitable for high concentrations of H2S, e.g., 27 to 46 percent, are also desirable. The sandwich material must also be sufficiently elastic to withstand, without breaking up, the stresses required to urge the metal rings 208–211 closer to the walls of stem 45 and stuffing box 61 upon make-up. The sandwich material must deform (preferably elastically but at least plastically) without disintegration sufficiently to allow a change of shape sufficient to urge such metal rings 208–211 to deform in this manner. The sandwich material should preferably have the ability to flow elastically, like rubber, into such gaps. Some examples of materials suitable for the sandwich rings 213 are "Teflon" (Tetrafluoroethylene polymer), "Molly-Teflon" (like Teflon but including about 15 percent MoS2 (molybdenum sulfide)) and "Grafoil" (compacted graphite). These materials rub off onto the stem 45, filling the low places and forming a film overall and lubricating the areas of contact between steam 45 and metal gaskets 209, 210. A composite stack, e.g., of "Molly-Teflon" and "Grafoil" may also be used. If lubrication is deemed less important, a material such as Hycar could be employed. Although elastic material is preferred for the sandwich material, soft plastic metal such as lead might be employed.

Transverse passage 231 in bonnet 22 provides communication between annular space 227 and bleeder valve 233 to relieve any build up of line fluids in annular space 227. Bleeder valve 233 may be of a standard bleeder screw and ball construction as shown in FIG. 1.

Transverse passage 235 located in bonnet 22 on the opposite side of bonnet 22 from transverse passage 231 provides communication between annular space 227 and plastic packing fitting 237 in coaxial bore 300 in bonnet 22. Bore 300 has a larger diameter than transverse passage 235, forming sloping annular shoulder 302 between them. Bore 300 provides communication between transverse passage 235 and threaded coaxial bore 304. Bore 304 includes threads 306. Plastic packing fitting 237 is disposed in bores 300, 304. The body 310 of plastic packing fitting 237 is cylindrically shaped and includes partial threaded external portion 311. Threads 311 are the same pitch as threads 306 and engage threads 306. Body 310 further includes external, enlarged hexoginal head 313 at the outer end 315 of body 310. Body 310 further includes first bore 312 through body 310. Body 310 further includes counterbore 314 coaxial with first bore 312, forming frustoconical shoulder 316 between them. Counterbore 314 provides communication between transverse passage 235 and first bore 312. The diameter of counterbore 314 should be large enough to permit insertion of ball 317 therein. Transverse bore 318 is formed near the inner end 320 of body 310. Cylindrical pin 322 is disposed in transverse bore 318 and has sufficient diameter to retain ball 317 in counter-bore 314. Body 310 further includes a second threaded bore 324 which is larger than and coaxial with first bore 312, forming frustoconical shoulder 326. Second bore 324 includes threads 328 which extend to the end 329 of head 313. First bore 312 provides communication between counterbore 314 and second bore 324. Second bore 324 provides communication between first bore 312 and end 329 of head 313. Threaded set screw 330, having threads 332 of the same pitch as threads 328, is disposed in second bore 324 at the end of threaded bore 324 closest to the end 329. Set screw 330 should be removable to permit plastic packing to be inserted. The threads 332 of screw 330 and threads 329 should be sufficiently strong and long to permit screw 330 to force the plastic packing into annular space 227 should seal assembly leak causing line fluid to flow into annular space 227. Screw 330 threads 332 and threads 329 should be constructed, for example, to withstand being subjected initially to 70 pound-feet of torque and being subjected to increments of 10 pound-feet of torque until a seal for the leak is effected, up to, for example, 140 pound-feet without distortion.

FIG. 2 is a schematic view of a stem seal means 59. The change in shape of the lubricant ring 213 and the movement of the metal rings 208–211 to conform to the faces of the stuffing box 61 and stem 45 is illustrated by comparing the left hand side of the figure (FIG. 2a) with the right hand side (FIG. 2b). Note also that the metal rings 208–211 do not engage the stem 45 or interior of the stuffing box 61 prior to loading by packing gland 63.

In making up seal assemblies 206, 207, spring 205, metal rings 217, 219, 221, and 229, and seal assemblies 206, 207 are first assembled in the stuffing box in the order described supra. Torque is then applied to the packing gland 63, such as to 600 to 900 pound-feet as described supra. Torque applied to the packing gland 63 causes the face of the gland 63 abutting metal ring 229 to exert compressive force on metal ring 229. This compressive force on metal ring 229 is transmitted into the lubricant rings 213 (indicated by force arrows 241, 243, 245, 247 of FIG. 3) and throughout the entire stem seal means 59 (FIGS. 2b, 3) to spring 205. Metal rings 208–211 are sufficiently thin so that as compressive load is applied to the lubricant ring 213 by packing gland 63, flanges 202, 204 of lubricant ring 213 would force metal rings 208, 211 to expand and contact the bore 64 of stuffing box 61 as a result of the pressure exerted on rings 208, 211 (indicated by force arrows 241, 247 in FIG. 3) by the expansion of flanges 202, 204 of lubricant ring 213 as ring 213 is compressed. Similarly, metal rings 209, 210 would be forced to collapse onto the stem 45 as a result of the pressure applied by flanges 202, 204 of lubricant ring 213. This will result in zero gaps with respect to lubricant extrusion from lubricant ring 213 between the metal rings 209, 210 and stem 45 and between the metal rings 208, 211 and bore 64 of stuffing box 61 for both seals 206, 207. Zero gaps, with respect to lubricant extrusion from lubricant ring 213, will also occur between the metal rings 208 and 209 and metal ring 229 and between metal rings 210 and 211 and metal ring 221 for seal assembly 206 as a result of compression. Also, zero gaps, with respect to lubricant extrusion from lubricant ring 213, will also occur between the metal rings 208 and 209 and metal ring 219 and between metal rings 210 and 211 and metal ring 217 for seal assembly 207 as a result of compression. The lubricant ring 213 is thus prevented from extruding around any of the metal rings 208–211 of seal assemblies 206, 207 as the seal assemblies are compressed. Lubricant ring 213 therefore deforms as compressed, filling all tolerance space between the metal rings and forms fluid and gas tight seals with the internal surface stem 45 and with the bore 64 of stuffing box 61. Line fluid or gas is prevented from flowing past all of the metal rings 208–211 by the lubricant ring 213 in the compressed state.

If seal assemblies 206, 207 begin to leak, the leak may preferably be stopped by retorquing packing gland 63. Alternately, or in addition to, the retorquing operation, the leak may at least be temporarily stopped by insertion of plastic packing into plastic packing fitting 237 and torquing screw 330 as discussed supra.

In the second preferred embodiment, seal assembly 207', of the same structure as seal assembly 207, is located at the bottom 251 of stuffing box 61 as shown in FIG. 4 or may be located on top of a trash ring (not shown) inserted prior to the seal assembly 207'. Follower ring 229' of the same structure as follower ring 229 is located between seal assembly 207' and packing gland 63. Packing gland 63 causes compression of the lubricant ring 213, expansion of metal rings 208, 211, and contraction of metal rings 209, 210 as discussed supra. However, there is no second seal assembly, back-up plastic packing, additional metal rings, or spring.

In the third preferred embodiment, seal assemblies 206" and 207", of the same structure as seal assemblies 206 and 207, are located in stuffing box 61 with seal assembly 207" located at the bottom 251 of stuffing box 61, as shown in FIG. 5. Seal assembly 207" may also be located on top of a trash ring (not shown) inserted prior to the seal assembly 207". Seal assemblies 206" and 207" are separated from each other by lantern ring 253. Lantern ring 253 is approximately twice the length and the same width in cross-section as metal rings 217, 219, 221 and 229. Lantern ring 253, has frustoconical grooves 256, 255 cut into its inner and outer periphery forming annular spaces 258, 257, respectively. Outer annular space 257 forms annular space 227. Transverse passages 260 cut into the center of lantern ring 253 provides communication between inner annular space 258 and outer annular space 257. Transverse passages 231 and 235 in bonnet 22 provide communication between outer annular space 227 and bleeder valve 233 and plastic packing fitting 237 respectively. The upper end of seal assembly 206" is adjacent to a follower ring 229" of the same structure as follower ring 229. Follower ring 229" is located adjacent to the lower face of packing gland 63. Packing gland 63 causes compression of the lubricant rings 213, expansion of metal rings 208, 211 and contraction of metal rings 209, 210 as discussed supra. However, there is no spring below seal 207" nor dual metal rings between seals 206", 207".

Although the system described in detail supra has been found to be the most satisfactory and preferred, many variations in structure are possible. For example, the metal rings may be of any suitable shape, such as right triangular. Moreover, the stem seals may be used in an unbalanced valve configuration. Also, the stem seals may be used with other types of valves and moving member systems, including non-rising type stems such as those which only rotate. Additionally, no spring may be required in any seal means.

The above are exemplary of the possible changes or variations.

Because many varying and different embodiments may be made within the scope of the inventive concept herein taught and because many modifications may be made in the embodiments herein detailed in accordance with the descriptive requirements of the law, it should be understood that the details herein are to be interpreted as illustrative and not in a limiting sense.

What is claimed as invention is:

1. A valve including a hollow body having a flow path therethrough and a port, stem gate means in the body moving to control fluid flow through the body and including an actuator and a stem extending through the port in the body from the inside thereof, there being an annular stuffing box in the body around the stem, stem seal means in the stuffing box, and a packing gland engageable with the stem seal means for compressing the stem seal means, the stem seal means including at least one seal assembly having four metal back-up rings and one seal ring, the seal ring having grooves on its outer periphery adjacent to each of the metal back-up rings and the seal ring being made of a more compliant material than the metal back-up rings, the stem seal means further including a second seal assembly and a first metal ring, the metal ring being sandwiched between the first and second seal assemblies.

2. Valve according to claim 1 wherein the stem seal means further includes a second and a third metal ring, the second metal ring being adjacent the first seal assembly and on the opposite side of the first seal assembly from the first metal ring, and the third metal ring being adjacent the second seal assembly and on the opposite side of the second seal assembly from the first metal ring.

3. Valve according to claim 2 wherein the first metal ring includes an annular opening and there is further included
a packing fitting;
a passage between the annular opening and the external surface of the body; and
means for receiving and holding the packing fitting to the body at the position the passage emerges on the external surface of the body.

4. Valve according to claim 2 wherein the first metal ring includes dual ring elements adjacently located.

5. Valve according to claim 4 wherein the first ring element has a downwardly, inwardly facing lower shoulder on its outer periphery and the second ring element has an upwardly, outwardly facing upper shoulder on its outer periphery, the shoulders being juxtaposed forming an annular opening there between.

6. Valve according to claim 2 wherein the first metal ring includes a transverse groove on its inner periphery and a transverse groove on its outer periphery and a channel through the first metal ring connecting the grooves.

7. Valve according to claim 1 wherein the first ring element has a length greater than the greatest of the combined lengths of the two of the metal back-up rings adjacent to it at its lower and upper end.

8. A valve including a hollow body having a flow path therethrough and a port, stem gate means in the body moving to control fluid flow through the body and including an actuator and a stem extending through the port in the body from the inside thereof, there being an annular stuffing box in the body around the stem, stem seal means in the stuffing box, and a packing gland engageable with the stem seal means for compressing the stem seal means, the stem seal means including at least one seal assembly having four metal back-up rings and one seal ring, the seal ring having grooves on its outer periphery adjacent to each of the metal back-up rings and the seal ring being made of a more compliant material than the metal back-up rings, each of the metal back-up rings being of rectangular cross section.

9. Valve of claim 8 wherein the stem and stuffing box sides are cylindrical surfaces.

10. A valve including a hollow body having a flow path therethrough and a port, stem gate means in the body moving to control fluid flow through the body and including an actuator and a stem extending through the port in the body from the inside thereof, there being an annular stuffing box in the body around the stem, stem seal means in the stuffing box, and a packing gland engageable with the stem seal means for compressing the stem seal means, the stem seal means including at least one seal assembly having four metal back-up rings and one seal ring, the seal ring having grooves on its outer periphery adjacent to each of the metal back-up rings and the seal ring being made of a more compliant material than the metal back-up rings, the stem seal means including a follower ring located between the seal assembly and the packing gland.

11. A valve including a hollow body having a flow path therethrough and a port, stem gate means in the body moving to control fluid flow through the body and including an actuator and a stem extending through the port in the body from the inside thereof, there being an annular stuffing box in the body around the stem, stem seal means in the stuffing box, and a packing gland engageable with the stem seal means for compressing the stem seal means, the stem seal means including at least one seal assembly having four metal back-up rings and one seal ring, the seal ring having grooves on its outer periphery adjacent to each of the metal back-up rings and the seal ring being made of a more compliant material than the metal back-up rings, the metal back-up rings closest to the stem having a rectangular cross section and the metal back-up rings closest to the stuffing box having a substantially square cross section.

12. Valve according to claim 11 wherein the cross section of the metal back-up rings has a height in the range of 0.100 to 0.103 inch and the cross section of the metal back-up rings closest to the stem has a width in the range of 0.150 to 0.153 inch and the cross section of the metal back-up rings closest to the stuffing box has a width in the range of 0.100 to 0.103 inch.

* * * * *

UNITED STATES PATENT AND TRADEMARK OFFICE
CERTIFICATE OF CORRECTION

PATENT NO. : 4,340,204
DATED : July 20, 1982
INVENTOR(S) : David P. Herd

It is certified that error appears in the above—identified patent and that said Letters Patent is hereby corrected as shown below:

Column 3, line 8; change "taking" to -- taken --.

Column 5, line 43; delete "215 - 218" and insert -- 214, 215, 216, 218 --.

Column 8, line 17; delete "329" and insert -- 328 --.

Column 8, line 21; delete "329" and insert -- 328 --.

Signed and Sealed this

Ninth Day of November 1982

[SEAL]

Attest:

GERALD J. MOSSINGHOFF

Attesting Officer          Commissioner of Patents and Trademarks